/ 
US009104809B2

(12) United States Patent
Prasad et al.

(10) Patent No.: US 9,104,809 B2
(45) Date of Patent: Aug. 11, 2015

(54) FACILITATING AUTOMATED VALIDATION OF A WEB APPLICATION

(75) Inventors: Mukul R. Prasad, San Jose, CA (US); Sreeranga P. Rajan, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 341 days.

(21) Appl. No.: 12/730,905

(22) Filed: Mar. 24, 2010

(65) Prior Publication Data
US 2011/0239104 A1    Sep. 29, 2011

(51) Int. Cl.
G06F 11/36    (2006.01)
(52) U.S. Cl.
CPC .................................. G06F 11/3684 (2013.01)
(58) Field of Classification Search
CPC .............. G06F 17/30893; G06F 17/30864; G06F 3/0481; G06F 17/2288; G06F 17/30914; G06F 17/30887; G06F 17/30899; G06F 11/3684
USPC .................................. 715/234, 243, 254, 255
See application file for complete search history.

(56) References Cited

U.S. PATENT DOCUMENTS

| | | | |
|---|---|---|---|
| 7,076,652 B2 | 7/2006 | Ginter et al. | 713/153 |
| 7,269,433 B2 | 9/2007 | Vargas et al. | 455/502 |
| 8,239,239 B1 | 8/2012 | Malhotra et al. | 705/7.27 |
| 2004/0204085 A1 | 10/2004 | Vargas et al. | 455/557 |
| 2006/0200749 A1* | 9/2006 | Shenfield | 715/501.1 |
| 2008/0081662 A1* | 4/2008 | Strandell et al. | 455/557 |
| 2008/0092119 A1* | 4/2008 | Sweis | 717/124 |
| 2010/0180256 A1* | 7/2010 | Gorthi et al. | 717/124 |
| 2011/0125593 A1 | 5/2011 | Wright et al. | 705/14.73 |

OTHER PUBLICATIONS

Bolin, M. et al., *"Automation and Customization of Rendered Web Pages,"* UIST, pp. 163-172, 2005.
Bolin, M. *End-user Programming for the Web.* MEng thesis, Massachusetts Institute of Technology, Jun. 2005.
Bolin, M. et al., *"Naming Page Elements in Eng-User Web Automation."* Workshop on End-User Software Engineering, ICSE, 2005.
Bolin, M. et al., "End-User Programming for the Web," http://groups.csail.mit.edu/uid/projects/chickenfoot/, 2 pp, Accessed Mar. 24, 2010.
"Selenium Documentation," http://seleniumhq.org/docs, Mar. 5, 2010.
U.S. Appl. No. 12/787,979, filed May 25, 2010.
Mukul R. Prasad, Response to Nonfinal Office Action for U.S. Appl. No. 12/787,979, Mar. 5, 2013.
USPTO, Nonfinal Office Action for U.S. Appl. No. 12/787,979, Dec. 6, 2012.
Mukul R. Prasad, Notice of Allowance and Fees Due for U.S. Appl. No. 12/787,979, Apr. 15, 2013.

* cited by examiner

*Primary Examiner* — Kyle Stork
(74) *Attorney, Agent, or Firm* — Baker Botts, L.L.P.

(57) ABSTRACT

In one embodiment, a method includes accessing one or more document object model (DOM) representations of one or more pages of a Web application that comprises one or more instances of a web-application artifact. For each of one or more of the instances, the method also includes identifying a first set of one or more DOM elements in one of the DOM representations of one of the pages that collectively correspond to the instance. The method additionally includes identifying a second set of one or more particular values of one or more particular attributes of one or more particular ones of the DOM elements in the first sets. The second set may then be mapped to the web-application artifact to provide a DOM definition of the web-application artifact.

24 Claims, 3 Drawing Sheets

US 9,104,809 B2

FACILITATING AUTOMATED VALIDATION OF A WEB APPLICATION

TECHNICAL FIELD

This disclosure relates generally to validating Web applications.

BACKGROUND

With computer-based applications in high demand, and particularly Web applications designed for use in connection with the World Wide Web, the importance of the quality assurance process is ever-increasing. Applications, and Web applications in particular, are difficult to test because the set of all possible user inputs allowed by the interface of an application can be very large. Previously known methods of validating Web applications specify checks on Web application artifacts, such as, for example, screens, buttons, and links, by directly referring to the underlying implementation of the artifact. This typically requires some knowledge of the underlying implementation of the Web application. In contrast, system-level (end-to-end) Web application test engineers, who do not have knowledge about the underlying implementation of the Web application, typically manually exercise use-case test scenarios on a Web application, one by one, by visually observing artifacts presented with the deployed Web application and "firing" events at these artifacts. As an example, firing events at artifacts may include clicking, as for example with a mouse or other input device, on buttons and links, or entering data into forms displayed in a user interface, such as a Web browser displaying a rendered instance of the Web application. This conventional mode of testing precludes the use of any automated testing or validation techniques since an automated tool or technique requires implementation (i.e., code-level) references to the Web application artifacts being tested. An advancement in this regard is offered by "record-and-replay" testing frameworks, which record a use-case test scenario being manually exercised by a tester and can automatically replay the manually exercised use-case test scenario at a later time. However, this automation is valid only for that particular test scenario, not any other general scenario much less for validating general global requirements over a set of scenarios, such as in model checking.

DESCRIPTION OF EXAMPLE EMBODIMENTS

Figure 1:
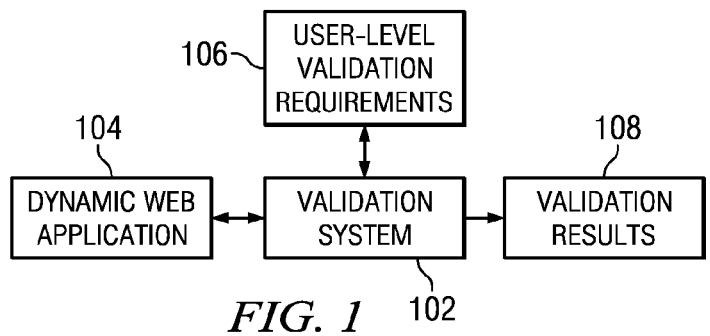
FIG. 1 illustrates an example environment of an example system for validating Web applications.

Particular embodiments relate to validating Web applications, and particularly, Web 2.0 applications. Web 2.0 applications may generally refer to dynamic or interactive Web applications that facilitate interactive information sharing, interoperability, user-centered design, or collaboration via the World Wide Web or other suitable or appropriate network environment. Web applications, and Web 2.0 applications in particular, often take the form of, utilize, or are characterized by a number of widgets. A widget may generally refer to a stand-alone application or portable chunk of code that can be installed and executed within a separate renderable structured document, such as, for example, a Hyper Text Markup Language (HTML)-based web page, or otherwise embedded into a third party site by a user on a page where such user has rights of authorship (eg. a webpage, blog, or profile on a social media site). Examples of Web 2.0 applications may operate in conjunction with web-based communities, hosted services, social-networking sites, video-sharing sites, or wilds, among other possibilities.

Particular embodiments relate to black-box testing or validation of a Web application, otherwise referred to as end-to-end global requirement checking of a Web application. Black-box validation techniques may generally refer to testing techniques in which the tester has no knowledge of the test object's internal structure. More particularly, black-box validation of a Web application may refer to validation of a Web application where the tester (user) has the Web application, has access to the Web application, or otherwise has the ability to interact with the deployed Web application, but where the tester may have no internal knowledge of the internals of the Web application, have no access to the underlying code, or simply desires to test the Web application without using or referring to the underlying code.

Particular embodiments relate to automatically extracting a precise characterization of one or more Web artifacts of a Web application. For example, a Web artifact may be a clickable button, link, hyperlink, image, text box, pull-down menu, or frame, and which is rendered on one or more pages of a rendered Web application. In some cases, a Web artifact as used herein may refer to a page or rendered screen shot of a Web application itself. In particular embodiments, the characterization is a mapping from a natural language reference to the Web artifact (e.g., "home login button") to a set of implementation-level attributes of the Web artifact that uniquely identify or define the Web artifact at, for example, the programmatic level within a particular Web application in all test-cases and contexts of the particular Web application. In particular embodiments, a natural language reference to, or representation of, a Web artifact may refer to a reference or representation made using vocabulary and syntax similar to the user's spoken language vocabulary and syntax; that is, how the user might refer to the Web artifact when discussing the Web artifact with another human tester. In particular embodiments, this characterization may then be used by, for example, test engineers who may have no knowledge of or familiarity with the underlying implementation of the Web application, to write requirements, properties, or test-cases (to be subsequently validated) involving these mapped Web artifacts, by simply using the natural language references to these Web artifacts. Particular embodiments include a training phase in which the user exercises the Web artifacts of the given Web application in various test cases or scenarios while a validation tool "observes" and "learns" about the underlying implementations of the respective Web artifacts.

Particular embodiments offer one or more of the following advantages: enabling automated validation of a Web application without requiring the tester to have any implementation-level knowledge of the underlying code of the Web application; allowing a test engineer to specify requirements for (on) a Web application while using easy-to-use natural language references of various Web artifacts of (in) a particular Web application; permitting different users to develop and use their own individual preferred "vocabulary" of names when referring to particular Web artifacts or when using these references in test cases or specifying requirements for validating the respective Web application; and facilitating the use of and being compatible with a wide array of validation tools ranging from traditional one-trace-at-a-time testing techniques to all-possible scenario model checking tools.

FIG. 1 illustrates an example environment 100 of an example validation system 102. Validation system 102 may include one or more hardware components, one or more software components, or a combination of hardware and software components. Components of validation system 102 may execute or operate within one or more computer systems, such as those described in more detail below with reference to FIG. 6. Validation system 102 is configured to access Web application 104. In particular embodiments, Web application 104 is deployed, at least in part, at the same computer system(s) as validation system 102. In an alternate embodiment, Web application 104 may be deployed at one or more separate computer systems that are connected or coupled either directly or indirectly with the computer system(s) hosting validation system 102. Web application 104 may also be hosted, at least in part, at one or more external or third party servers or computing systems.

Generally, a Web application is an application that may be accessed via a Web browser (e.g., MICROSOFT WINDOWS INTERNET EXPLORER, MOZILLA FIREFOX, APPLE SAFARI, GOOGLE CHROME, or OPERA) or other client application over a network, or a computer software application that is coded in a Web browser-supported language and sometimes reliant on a Web browser to render the application executable. Web applications have gained popularity largely as a result of the ubiquity of Web browsers, the convenience of using a Web browser launched at a remote computing device as a client (sometimes referred to as a thin client), and the corresponding ability to update and maintain Web applications without necessarily distributing and installing software on remote clients. Often, to implement a Web application, the Web application requires access to one or more resources provided at a backend server of an associated Website. Additionally, Web applications may often require access to additional resources associated with other applications.

A Web application deployed with or at an end-user's machine (client device) may cause a Web page to be rendered on a display of the end-user's machine. Web applications that execute in conjunction with or in the context of a Web browser may cause the Web browser to render a Web page on the display. Web pages of Web applications typically include embedded links to other Web pages of the Web application as well as to Web pages and Web sites external to or not affiliated with the Web application. Dynamic Web applications in particular often include a plurality of embedded links which may be rendered on the currently viewed Web page as a hyperlink, icon, or other "clickable" feature. Typical dynamic Web applications may include a plurality of resources located at the server(s) hosting the Web applications or retrieved from external third party servers. A Web page or resource for rendering a Web page, which may themselves include multiple embedded resources, may include data records, such as content plain textual information, or more complex digitally encoded multimedia content, such as software programs or other code objects, graphics, images, audio signals, videos, and so forth. One prevalent markup language for creating Web pages is the Hypertext Markup Language (HTML). Other common Web browser-supported languages and technologies include the Extensible Markup Language (XML), the Extensible Hypertext Markup Language (XHTML), JavaScript, Cascading Style Sheet (CSS), and JAVA, among others. By way of example, HTML enables an application or Web page developer to create a structured document by denoting structural semantics for text and links, as well as images, Web applications and other objects that can be embedded within the page. Generally, a Web page may be delivered to a client as a static structured document, however, through the use of Web elements embedded in the page (e.g., executable JavaScript code segments), an interactive experience may be achieved with the page or a sequence of pages. During a user session at the client device, the Web browser interprets and displays the pages and associated resources received or retrieved from the Web application or Website hosting the Web page, as well as, potentially, resources from other Websites. By way of example, upon receipt of an HTML structured document by a Web browser, the Web browser may executed embedded calls including JavaScript code segments, which then call or request resources from third party hosts or Websites.

Typically, a web browser used to access a webpage (or structured document) for rendering at a client device, obtains the required resources (e.g., in response to executing JavaScripts or other calls embedded in a requested and received structured document and which may include HTML or XML code and/or JavaScript scripts and/or content including text, audio, and video) for rendering the webpage from one or more servers and then constructs a browser representation of the webpage. In particular embodiments, the browser representation may be a Document Object Model (DOM) representation of the webpage. The web browser then renders the page in the particular client viewing window of the browser utilizing the DOM (or other suitable) representation. By way of background, the DOM is an application programming interface (API) for, by way of example, valid HTML and well-formed XML documents. A DOM representation of a structured document defines the logical structure of the document as well as the way the document is accessed and manipulated. The structure of a DOM representation is generally based on an object structure that closely resembles the logical structure of the document (e.g., webpage) it models. The DOM representation is generally hierarchical in nature. More particularly, by way of example, a DOM representation typically has a logical structure that resembles a tree or group of trees each having branches that link DOM nodes of a plurality of DOM levels. In such a manner, a given DOM node at one DOM level of the DOM hierarchy may have (hereinafter also "include," "comprise," or "be associated with") one or more "child" nodes each logically arranged in a lower child DOM level, that, in turn, each have one or more of their own child nodes logically arranged in a still lower grandchild DOM level, and so on. As those of skill in the art will appreciate, as one proceeds logically through the hierarchy to lower DOM levels, the corresponding DOM nodes in those lower levels become more detailed in their representation of ever-smaller logical portions of the corresponding structured document. In this way, all the text and other content specified in the underlying HTML and/or other code is translated by the browser into DOM nodes or elements of finer and finer granularity. By way of example, at a first level, the entire document (page) may be represented by a DOM root node. Progressing down the tree, the document may include a picture, video, interactive window, block of text, and/or other content including scripts and various calls to APIs represented in finer and finer detail by subsequent level nodes.

In particular embodiments, validation system 102 is configured to access Web application 104 over a network, such as, for example, an intranet, an extranet, a virtual private network (VPN), a local area network (LAN), a wireless LAN (WLAN), a wide area network (WAN), a metropolitan area network (MAN), a portion of the World Wide Web (Internet), or another network or combination of two or more such networks. The present disclosure contemplates any suitable network through which Web application 104 may be deployed in conjunction with validation system 102. In particular embodiments, validation system 102 initiates a session with one or more servers hosting Web application 104 by transmitting a request for Web application 104 to these hosting servers, such as, for example, in the form of an HTTP request. In particular embodiments, in response to receiving the request, the server hosting Web application 104 proceeds to generate a renderable implementation of Web application 104 in the form of an HTML or other structured document including structured document code and the content to be displayed as well as any embedded resources, or embedded calls and identifiers for the resources, for rendering the web page at or by validation system 102.

In particular embodiments, validation system 102 further has access to user-level validation requirements 106 for use in validating Web application 104. In particular embodiments, user-level validation requirements 106 include natural language references to various web artifacts of Web application 104, rather than implementation-level details of these Web artifacts. In particular embodiments, a validation requirement 106 may be a test case for Web Application 104. A test case may include a typical scenario of exercising Web application 104, such as a specific sequence of steps performed by a user of the Web application, as well as some explicit or implicit specification of what constitutes correct or valid behavior of the Web application under the scenario. Simply put, a test case may be considered a use case in combination with a correctness check (e.g., an expected result or outcome). In other embodiments, a validation requirement 106 may be a more expressive representation of the expected behavior of Web application 104, and written in a formalism such as, for example, temporal logic. Validation results 108 are output from validation system 102 as a result of validating one or more validation requirements 106 or other test or use cases on Web application 104.

Figure 2:
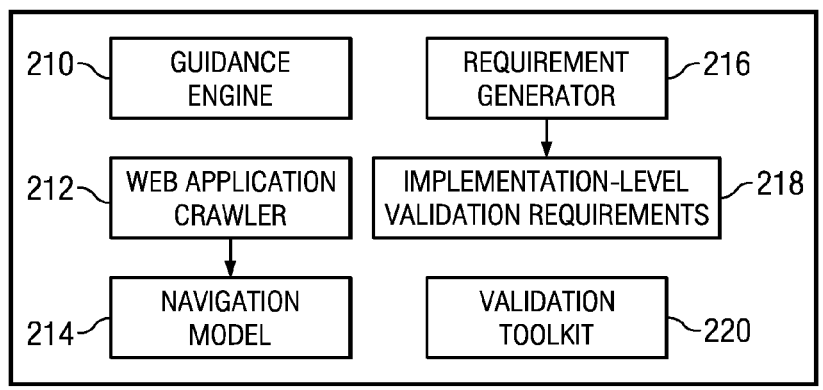
FIG. 2 illustrates an example system for validating Web applications.

As illustrated more particularly in FIG. 2, validation system 102 may include guidance engine 210, Web application crawler 212, requirement generator 216, and validation toolkit 220. In particular embodiments, with the aid of guidance engine 210, crawler 212 accesses and crawls Web application 104 and outputs a navigation model 214. In particular embodiments, requirement generator 216 generates implementation-level validation requirements 218 based at least in part on user-level validation requirements 106; that is, requirement generator 216 may take as input property or test case expressions expressed in a natural language representation as described herein and generate computer- or machine-readable instructions (implementation-level validation requirements 218) that are input to validation toolkit 220, which is configured to read the computer-readable validation requirements 218. In particular embodiments, validation toolkit 220 is configured to validate Web application 104 using navigation model 214 in conjunction with implementation-level validation requirements 218 and, subsequently, output validation results 108. More particularly, validation toolkit 220 may be configured to take as input navigation model 214 and implementation-level validation requirements 218 and check validation requirements 218 against navigation model 214 to validate Web application 104. For example, validation results 108 may include one or more results, tables, or graphs, stored in a memory of validation system 102 or elsewhere, and which provide an objective evaluation of Web application 104, including whether or not each of the validation requirements 218 were satisfied or more generally whether one or more navigational or business logic properties or requirements were satisfied. Additionally, in some embodiments, requirement generator 216 may take as input natural language mappings of Web artifacts as described herein, generate use or test cases in the form of natural language representation expressions as described herein using the mappings of the Web artifacts, and then generate implementation-level validation requirements 218 based on the generated expressions.

Figure 4:
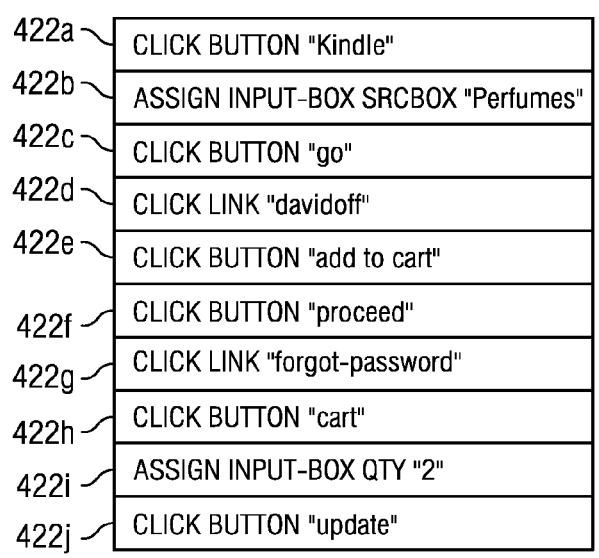
FIG. 4 illustrates an example natural language representation of an example use case.
Figure 3:
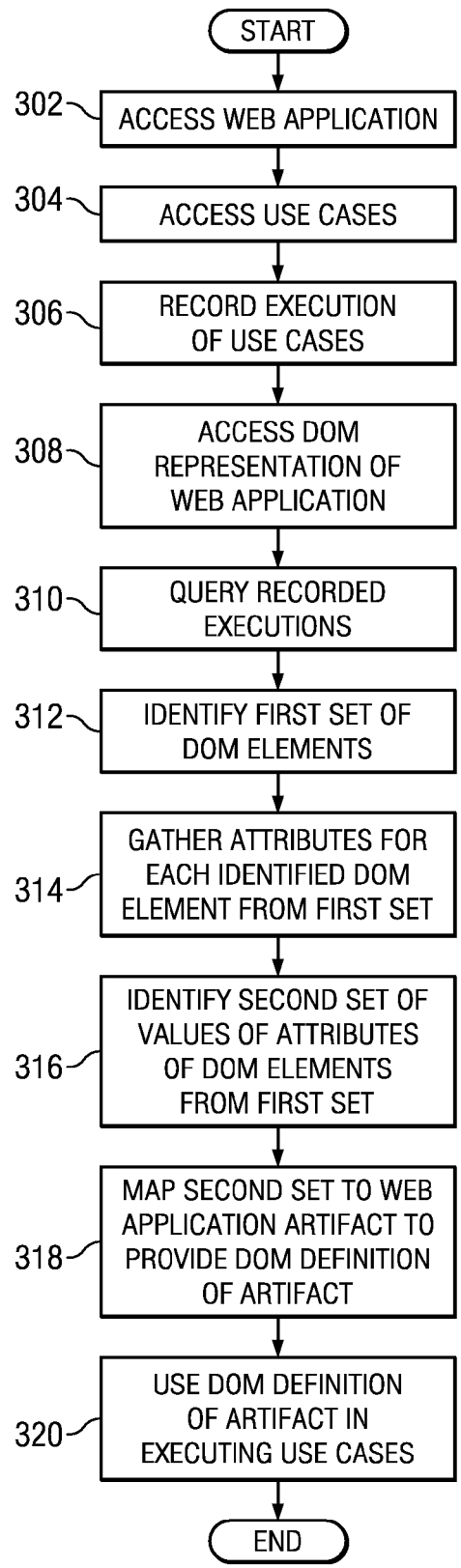
FIG. 3 shows a flowchart illustrating an example method for providing definitions for one or more Web artifacts of a Web application.

FIG. 3 shows a flowchart illustrating a method for providing definitions for one or more Web artifacts of a Web application. In particular embodiments, the method begins at 302 with accessing Web application 104 by validation system 102. The method may then proceed at 304 with validation system 102 accessing use or test cases 106. Each use case 106 includes a sequence of actions to be taken on various artifacts rendered in instances of Web application 104. In particular embodiments, use cases 106 are expressed in a natural language representation as described above. FIG. 4 illustrates an example use case 106 for Amazon.com in which each action 422 is specified as a natural language 3-tuple or 4-tuple. In the case of a 3-tuple, each action to be taken may be expressed as <action, type, name>, while in the case of a 4-tuple, each action to be taken may be expressed as <action, type, name, value>. Examples of "actions" include clicks, assigns, and mouse-overs while examples of "types" include links, buttons, and input-boxes. The "name" is a user-designated arbitrary string while "value" is the actual string value applied by the user in the use case. As an example, the natural language representation of action 422a, 'click button "kindle,"' instructs the tester to click a button named or associated with the kindle digital reader. As another example, the natural language representation of action 422i, 'assign input-box qty "2,"' instructs the tester to enter a value (quantity) of 2 is the input-box named or associated with the quantity. In particular embodiments, validation system 102 includes or is coupled to a display and one or more user input devices for use by one or more human testers in exercising the use cases 106.

While the user (tester) is manually exercising use cases 106, validation system 102 records, at 306, the user's actions relative to each action's respective natural language representation. This represents the first portion of the training phase alluded to above. It should also be noted that use cases 106 generally represent only a fraction of the use cases that may be desired to be executed on Web application 104 in validating Web application 104 (this will be described in more detail below). In one embodiment, validation system 102 records the user's actions with a DOM tracker, which may be included within or coupled to requirement generator 216 or other components of validation system 102. For example, the DOM tracker may take the form of a record-and-replay tool such as the SELENIUM integrated development environment (IDE). In particular embodiments, at some time subsequent to the training phase, validation system 102, and more particularly, requirement generator 216, queries the recorded executed actions (executions) at 310 with respect to the actions specified in the executed use cases 106. More particularly, requirement generator 216 may access one or more DOM (or other browser or client application) representations of one or more pages of Web application 104 generated as a result of executing use cases 106. Each page may generally include one or more instances of each of one or more web-application artifacts and each of the DOM representations generally includes a plurality of DOM elements that each have a value for each of one or more attributes.

In particular embodiments, the method proceeds at 312 with identifying, for each of one or more of the instances, a first set of one or more of the DOM elements in one of the recorded DOM representations of one of the pages that collectively correspond to the instance. In particular embodiments, each first set of DOM elements associated with an instance of a particular Web-application artifact may include a DOM sub-tree that includes a root DOM node and one or more child DOM nodes. In some cases, the root DOM node (or one or more of the child DOM nodes of the sub-tree root node) may include an event handler for the Web-application artifact. The method may then proceed at 314 with querying the recorded executions (and the respective DOM representations of the pages generated based on the recorded executions) to gather attributes for each identified DOM element from the first set.

In particular embodiments, the method proceeds at 316 with identifying a second set of values of particular attributes of particular DOM elements from the first set. Generally, there may be two or more instances of each particular Web-application artifact in Web application 104. In such cases, identifying the second set of values may include identifying the particular ones of the attributes from the DOM elements of the first set whose values are invariant with respect to each other across two or more instances of the Web-application artifact. As may be appreciated, values that are invariant across instances of a given artifact are generally more relevant in defining the artifact.

In cases in which the web-application artifact of interest is, or represents, an entire page of Web application 104 (as opposed to button, link, hyperlink, image, text box, pull-down menu, or frame, etc.) the artifact may be considered to include the entire DOM representation of a particular instance (there still may be one or more instances of the artifact in the Web application), and hence, the first set of DOM elements for the artifact may include all of the DOM elements in the DOM representation of a particular instance. In such cases, identifying the second set of values for a particular artifact may include identifying particular ones of the attributes and their respective values based on a definition of the page provided by the user. Alternately, in one embodiment, the second set may include all the values of all the attributes of all the DOM elements in a DOM representation of a particular page.

In particular embodiments, validation system 102, and particularly requirement generator 216, then maps, at 318, the second set of values to the respective Web-application artifact to provide a DOM definition of the Web-application artifact. That is, the definition provides a link between the underlying code implementing the Web-application artifact and the natural language representation used to specify the artifact. In some embodiments, the DOM definitions of various artifacts of Web application 104 may then be used in automatically executing, at 320, use cases 106, or other use cases incorporating the same artifacts and specified or expressed in a consistent natural language representation, without run-time user input to further validate Web application 104. In order to ensure that subsequent use cases may be automatically executed, the subset of use cases 106 used in generating the DOM definitions should include all artifacts that may be encountered in the subsequently applied use cases.

In particular embodiments, requirement generator 216 uses the DOM definitions of all the artifacts of Web application 104 to generate an executable set of validation requirements 218 that may be used by validation toolkit 220 in conjunction with a navigation model 214 generated with Web application crawler 212 to automatically exercise every possible use case (or a rich subset thereof) of Web application 104 to validate the Web application. In particular embodiments, crawler 212 is configured to dynamically, automatically, and comprehensively navigate and exercise the Web application 104 under test. In a particular embodiment, crawler 212 operates as described in U.S. patent application Ser. No. 12/571, 374 filed 30 Sep. 2009 and entitled CLIENT-TIER VALIDATION OF DYNAMIC WEB APPLICATIONS. In a particular embodiment, crawler 212 navigates and exercises Web application 104 through a process referred to as "guided crawling."

Figure 5:
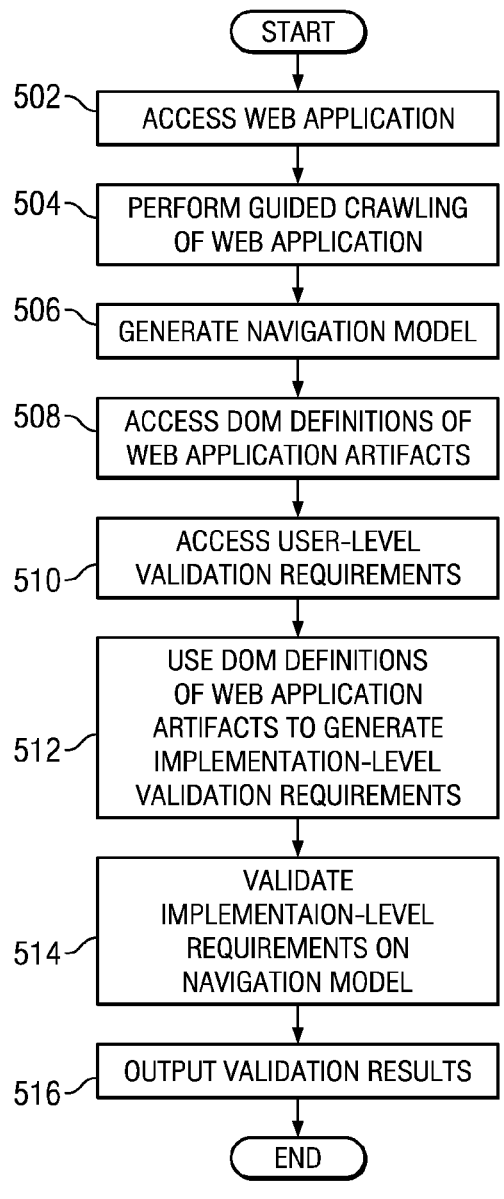
FIG. 5 shows a flowchart illustrating an example method for validating Web applications.

FIG. 5 shows a flowchart illustrating an example method for validating Web application 104 using the DOM definitions of Web-application artifacts mapped using the method of FIG. 3. The method may generally begin at 502 with accessing Web application 104 by crawler 212. Before, after, or concurrently with step 502, the method may proceed at 504 with crawling, and particularly guided crawling, of Web application 104. In particular embodiments, crawler 212, based on the crawling, then generates at 506 navigation (behavioral) model 214. As illustrated in FIG. 2, crawler 212 may receive input such as guidance instructions, parameters, and other information from guidance engine 210 for use by crawler 212 in crawling Web application 104. Before, after, or concurrently with steps 502, 504, or 506, validation toolkit 220 may access, at 508, the DOM definitions of the Web artifacts of Web application 104 generated by requirement generator 216. Before, after, or concurrently with steps 502, 504, 506, or 508, validation toolkit 220 may access, at 510, user-level validation requirements. In some embodiments, requirement generator 216, itself, accesses the Web application 104 or crawled Web application 104, and automatically generates the user-level validation requirements (e.g. test cases or properties with natural language representations of web artifacts) that include the natural language mappings to various Web artifacts of Web application 104, and that are then used in conjunction with the DOM definitions of the Web application artifacts to generate implementation-level validation requirements 218 at 512. In other embodiments, the user-level validation requirements may be input to requirement generator 216, at or prior to 510, from some other source and requirement generator 216 may generate, using the user-level validation requirements in conjunction with the DOM definitions of the Web application artifacts, implementation-level validation requirements 218 at 512.

In particular embodiments, navigation model 214 is a compact mathematical model or representation of the behavior of Web application 104 and, in particular embodiments, the client-tier of Web application 104. In one embodiment, navigation model 214 is formatted in XML and subsequently stored as an XML document or file by validation toolkit 220. Validation toolkit 220 may then use the navigation model 214 and validation requirements 218 (which encode the use cases and potentially also the DOM definitions) to automatically and without run-time user input validate Web application 104 by, for example, checking validation requirements 218 against navigation model 214 at 514. Validation toolkit 220 may then output validation results at 516. Again, validation results 108 may include, for example, one or more results, tables, or graphs, stored in a memory of validation system 102 or elsewhere, and which provide an objective evaluation of Web application 104, including whether or not each of the validation requirements 218 were satisfied or more generally whether one or more navigational or business logic properties or requirements were satisfied.

Figure 6:
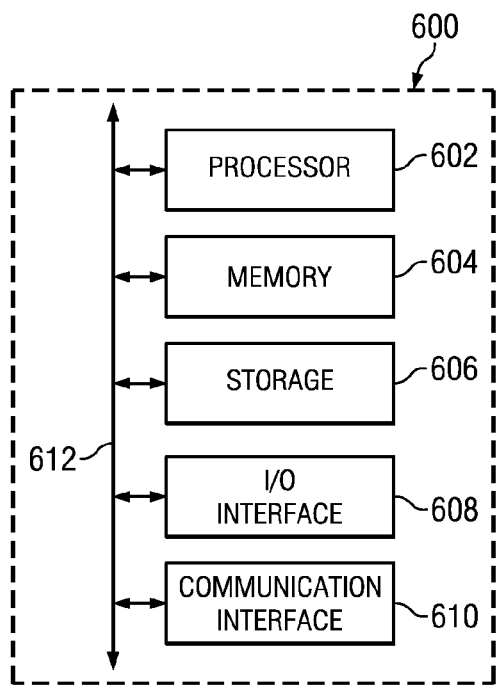
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
accessing one or more document object model (DOM) representations of one or more pages of a Web application that comprises one or more instances of a web-application artifact, each of the DOM representations comprising a plurality of DOM elements that each have a value for each of one or more attributes;
for each of one or more of the instances, learning, by an automated validation tool implemented on one or more processors and from a plurality of use-cases, that a first set of one or more of the DOM elements in one of the DOM representations of one of the pages collectively correspond to the instance;
learning, by the automated validation tool implemented on the one or more processors and from the plurality of use-cases, that a second set of one or more particular ones of the values of one or more particular ones of the attributes are associated with one or more particular ones of the DOM elements in the first sets; and
mapping, by the automated validation tool implemented on the one or more processors, the second set to the web-application artifact to provide a DOM definition of the web-application artifact.

2. The method of claim 1 further comprising:
accessing one or more use-cases for the Web application, the use-cases being expressed in a natural language; and
recording execution of the use-cases on the Web application by one or more humans;
wherein each of the first sets is identified by querying the recording with respect to the use-cases for the Web application.

3. The method of claim 2, wherein the execution of the use-cases is recorded in a web application record-and-replay tool.

4. The method of claim 2, wherein the DOM representations represent pages of the Web application reached by the human users during execution of the uses-cases on the Web application.

5. The method of claim 1, wherein:
there are two or more instances of the web-application artifact in the Web application; and
identifying the second set comprises identifying the particular ones of the attributes based on whether their values are invariant with respect to each other across the instances of the web-application artifact, their values being the particular ones of the values.

6. The method of claim 1, wherein one or more of the first sets each comprise a DOM sub-tree that comprises a root DOM node and one or more child DOM nodes.

7. The method of claim 6, wherein one or more of the root DOM nodes in the DOM sub-trees each comprise an event handler for the web-application artifact.

8. The method of claim 1, wherein the web-application artifact is one or more of a button, link, hyperlink, image, or text box on one or more of the pages of the Web application.

9. The method of claim 1, wherein:
the web-application artifact is a page of the Web application;
for each of the instances of the page, the first set comprises all the DOM elements in the DOM representation of the instance; and
identifying the second set comprises identifying the particular ones of the attributes and their values based on a definition of the page provided by a human user.

10. The method of claim 1, wherein:
the web-application artifact is a page of the Web application;
there is only one instance of the web-application artifact in the Web application;
the first set comprises all the DOM elements in the DOM representation of the page; and
the second set comprises all the values of all the attributes of all the DOM elements in the DOM representation of the page.

11. The method of claim 1, further comprising:
accessing one or more use-cases for the Web application, the use-cases being expressed in a natural language; and
using the DOM definition from the mapping of the second set to the web-application artifact to execute the use-cases automatically and without run-time user input to validate the Web application.

12. The method of claim 1, further comprising:
crawling the Web application;
generating from the crawling one or more use-cases for the Web application, the use-cases being expressed in a natural language; and
using the DOM definition from the mapping of the second set to the web-application artifact to execute the use-cases automatically and without run-time user input to validate the Web application.

13. One or more non-transitory computer-readable storage media encoding software that is operable when executed to:
access one or more document object model (DOM) representations of one or more pages of a Web application that comprises one or more instances of a web-application artifact, each of the DOM representations comprising a plurality of DOM elements that each have a value for each of one or more attributes;
for each of one or more of the instances, automatically learn, by an automated validation tool, from a plurality of use-cases that a first set of one or more of the DOM elements in one of the DOM representations of one of the pages collectively correspond to the instance;
automatically learn, by the automated validation tool, from the plurality of use-cases that a second set of one or more particular ones of the values of one or more particular ones of the attributes are associated with one or more particular ones of the DOM elements in the first sets; and
map, by the automated validation tool, the second set to the web-application artifact to provide a DOM definition of the web-application artifact.

14. The non-transitory computer-readable storage media of claim 13, wherein:
the software is further operable when executed to:
access one or more use-cases for the Web application, the use-cases being expressed in a natural language; and
record execution of the use-cases on the Web application by one or more humans;
each of the first sets is identified by querying the recording with respect to the use-cases for the Web application.

15. The non-transitory computer-readable storage media of claim 14, wherein the execution of the use-cases is recorded in a web application record-and-replay tool.

16. The non-transitory computer-readable storage media of claim 14, wherein the DOM representations represent pages of the Web application reached by the human users during execution of the uses-cases on the Web application.

17. The non-transitory computer-readable storage media of claim 13, wherein:
there are two or more instances of the web-application artifact in the Web application; and the software operable when executed to identify the second set comprises software operable when executed to identify the particular ones of the attributes based on whether their values are invariant with respect to each other across the instances of the web-application artifact, their values being the particular ones of the values.

18. The non-transitory computer-readable storage media of claim 13, wherein one or more of the first sets each comprise a DOM sub-tree that comprises a root DOM node and one or more child DOM nodes.

19. The non-transitory computer-readable storage media of claim 18, wherein one or more of the root DOM nodes in the DOM sub-trees each comprise an event handler for the web-application artifact.

20. The non-transitory computer-readable storage media of claim 13, wherein the web-application artifact is one or more of a button, link, hyperlink, image, or text box on one or more of the pages of the Web application.

21. The non-transitory computer-readable storage media of claim 13, wherein:
 the web-application artifact is a page of the Web application;
 for each of the instances of the page, the first set comprises all the DOM elements in the DOM representation of the instance; and
 the software operable when executed to identify the second set comprises software operable when executed to identify the particular ones of the attributes and their values based on a definition of the page provided by a human user.

22. The non-transitory computer-readable storage media of claim 13, wherein:
 the web-application artifact is a page of the Web application;
 there is only one instance of the web-application artifact in the Web application;
 the first set comprises all the DOM elements in the DOM representation of the page; and
 the second set comprises all the values of all the attributes of all the DOM elements in the DOM representation of the page.

23. The non-transitory computer-readable storage media of claim 13, wherein the software is further operable when executed to:
 access one or more use-cases for the Web application, the use-cases being expressed in a natural language; and
 use the DOM definition from the mapping of the second set to the web application artifact to execute the use-cases automatically and without run-time user input to validate the Web application.

24. The non-transitory computer-readable storage media of claim 13, wherein the software is further operable when executed to:
 crawl the Web application;
 generate from the crawling one or more use-cases for the Web application, the use-cases being expressed in a natural language; and
 use the DOM definition from the mapping of the second set to the web-application artifact to execute the use-cases automatically and without run-time user input to validate the Web application.

\* \* \* \* \*